(12) United States Patent
Abraham

(10) Patent No.: US 8,325,711 B2
(45) Date of Patent: Dec. 4, 2012

(54) EXTERNAL SYSTEM ACCESS TO TELEPHONE LINE THROUGH VOIP TELEPHONY DEVICE

(75) Inventor: John W. Abraham, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1199 days.

(21) Appl. No.: 12/144,413

(22) Filed: Jun. 23, 2008

(65) Prior Publication Data

US 2009/0059900 A1 Mar. 5, 2009

Related U.S. Application Data

(60) Provisional application No. 60/968,812, filed on Aug. 29, 2007.

(51) Int. Cl.
*H04L 12/26* (2006.01)
(52) U.S. Cl. ............................. 370/352; 340/506; 379/39
(58) Field of Classification Search .................. 370/352; 340/506; 379/39
See application file for complete search history.

(56) References Cited

U.S. PATENT DOCUMENTS

2003/0128115 A1* 7/2003 Giacopelli et al. ............ 340/506
2011/0044318 A1* 2/2011 Sharma et al. ................ 370/352

* cited by examiner

*Primary Examiner* — Melvin Marcelo
(74) *Attorney, Agent, or Firm* — Lori Anne D. Swanson

(57) ABSTRACT

A telephony device is configured to provide VoIP service at a customer premises and is also configured to provide an external system connected to the telephony device with the ability to seize a telephone line at the customer premises when needed. The telephony device includes an embedded MTA (EMTA), a telephone circuit, and a switch connector configured to connect the external system with the telephony device. When the external system is connected to the telephony device via the switch connector, the switch connector routes telephone signals between the EMTA and the telephone circuit though the external system, and the external system, such as an alarm system, may seize the line when needed. When the external system is not connected, the switch connector connects the EMTA and the telephone circuit.

20 Claims, 3 Drawing Sheets

EXTERNAL SYSTEM ACCESS TO TELEPHONE LINE THROUGH VOIP TELEPHONY DEVICE

PRIORITY

This application claims the benefit of U.S. Provisional Patent Application No. 60/968,812, filed Aug. 29, 2007, and entitled, "INTEGRATED ALARM SYSTEM WIRING ACCESS IN VOIP TELEPHONEY DEVICE." The aforementioned provisional patent application is incorporated by reference in its entirety.

BACKGROUND

Voice over Internet Protocol (VoIP) telephone service is becoming a highly popular alternative to conventional plain old telephone system (POTS) service traditionally used by customers and typically provided by the large telecommunication companies. As opposed to conventional circuit-switched networks, VoIP uses the Internet or other packet-switched networks to transmit voice between parties.

A customer that has VoIP as their only telephone service is faced with a challenge when they wish to have a monitored alarm system service. A typical wiring requirement for an alarm system is that the alarm system is the first device after the telephone service and before any other phones. This allows the alarm system to disconnect all other phones from the telephone line and then seize the line for exclusive alarm system use, such as to dial a remote monitoring facility, when the alarm is tripped.

For VoIP telephone service, it may not be possible to meet the alarm wiring requirements for line seizure. VoIP is deployed at the customer premises via a multimedia terminal adaptor (MTA). The MTA interfaces with an IP network and is operable to adapt VoIP data for use by customer premises equipment (CPE) devices, such as telephones, fax machines, answering machines, etc. The MTA may be embedded in a modem, such as a cable modem or DSL modem, as an embedded MTA (EMTA) or may be provided as a standalone device connected to the modem.

It is becoming more common to co-locate an EMTA and a telephone, such as a cordless telephone base station, in a single device. In this configuration, it is not possible to meet the alarm wiring requirement for line seizure, because the alarm system cannot be made the first device after the telephone service and before any other phones. Instead, in this integrated configuration of the EMTA and base station, the base station is hard wired as the next device after the EMTA. Thus, if the alarm system is connected to the base station or after the base station, then the alarm system cannot seize the line in emergency situations.

Even for EMTAs that do not include an embedded cordless telephone base station, the EMTA is connected directly to a telephone circuit providing connection to a twisted pair local loop at the customer premises. In this situation, the alarm system can be coupled to the local loop, but coupling the alarm system to the local loop does not meet the wiring requirements for the alarm system. Typical wiring requirements include a home run from the alarm system to the phone line that connects to the central office, which may be provided with a direct wired connection between the alarm system panel and a panel at the customer premises providing connection to a central office. Simply connecting the alarm system to a local loop does not provide the home run connection, and thus the alarm system may not be able to seize the line and may be susceptible to tampering.

BRIEF DESCRIPTION OF THE DRAWINGS

Embodiments are illustrated by way of example and not limited in the following Figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. Well known methods and structures may not be described in detail so as not to unnecessarily obscure the description of the embodiments.

According to an embodiment, a switch connector is provided between a terminal adapter (e.g., EMTA) and telephone circuits (e.g., a base station, RJ-11 connector or other connectors, etc.) in a telephony device. The switch connector provides connection between the EMTA and a telephone circuit when an external system, such as an alarm system, is not plugged into the switch connector. However, when the external system is plugged into the switch connector, signals between the EMTA and the telephone circuit are separated by a switching action in the switch connector, and all telephone signals are routed through the external system via the switch connector. Then, the external system, as needed, can seize the telephone line and make calls when needed. The embodiments described below describe the external system as an alarm system, and the telephony device provides the alarm system with the ability to seize the telephone line in a VoIP system, for example, to call a remote monitoring station or to call other emergency personnel. It will be apparent to one of ordinary skill that the external system may comprise systems or devices other than an alarm system.

Figure 1:
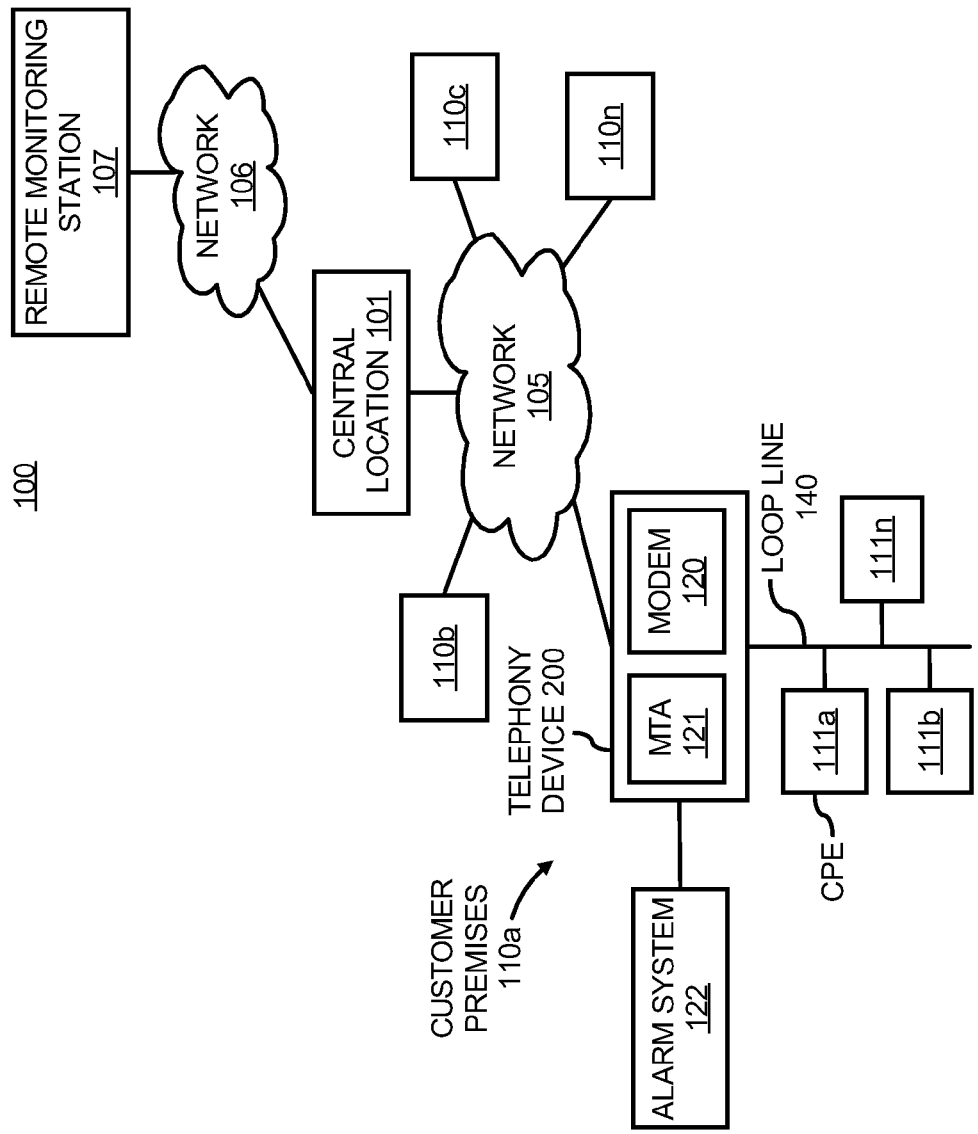
FIG. 1 illustrates a system, according to an embodiment.

FIG. 1 illustrates a system 100, according to an embodiment. The system 100 includes a central location 101 transmitting digital content, including VoIP packets, to a plurality of customer premises 110a-n via a network 105. The central location 101 may include a cable head-end or a central office connected to a cable head-end providing communication services to the customer premises 110a-n. The network 105 may include an IP network for providing digital communication services. The digital communication services may include a high-speed Internet connection, cable television, VoIP, and satellite services, etc. The central location 101 is connected to one or more systems via network 106. The network 106 may include one or more networks. The network 106 may include a packet switched and/or a circuit-switched network. In one example, a remote monitoring system 107 for customer premises alarm systems is connected to multiple customer premises 110a-n via the central location 101 and networks 105 and 106. Although not shown, other content and service providers may also be connected to the customer premises 110a-n.

The customer premises 110*a-n* may each include a telephony device including a modem and an MTA providing VoIP services. For example, the customer premise 10*a* is shown with a telephony device 200 including a modem 120 having an MTA 121. The MTA 121 and modem 120 may be provided as an EMTA, such as the EMTA 201 shown in FIG. 2, or provided as standalone devices. In one embodiment, the modem 120 is a cable modem. However, the modem 120 may include a DSL modem or other type of modem. The modem 120 is operable to receive digital data from the central location 101 for use at the customer premises 110*a*. The digital data may include digital audio (e.g., VoIP packets), digital video, data downloaded from the Internet, etc.

One or more CPE 111*a-c* may be connected to a twisted pair loop, referred to as the loop line 140, at the customer premises 110*a*. The loop line 140, for example, is a twisted pair copper subscriber line at the customer premises 110*a*. Examples of CPE include phones, answering machines, facsimiles, and others. The modem 120 receives the digital data sent via the network 105 shown in FIG. 1 and demodulates and formats the data for transmission on the loop line 140 and for use by the customer premises equipment (CPE). For example, if the system 100 includes a cable network architecture, the modem 120 receives high frequency cable (HFC) signals on predetermined channels carrying digital data, and the signals are demodulated as is known in the art.

The MTA 121 provides VoIP service for the customer premises 110*a*. For example, the MTA 121 generates tip and ring voltages on the loop line 140 to emulate a telephone central office.

According to an embodiment, an alarm system 122 is connected to the MTA 121. The alarm system 122 is connected between the MTA 121 and CPE 111*a-n*, so the alarm system 122 is operable to seize the telephone line if necessary to make emergency calls via the MTA 121. Note that the customer premises 110*b-n* may include similar configurations to the customer premises 110a shown in FIG. 1.

Figure 2:
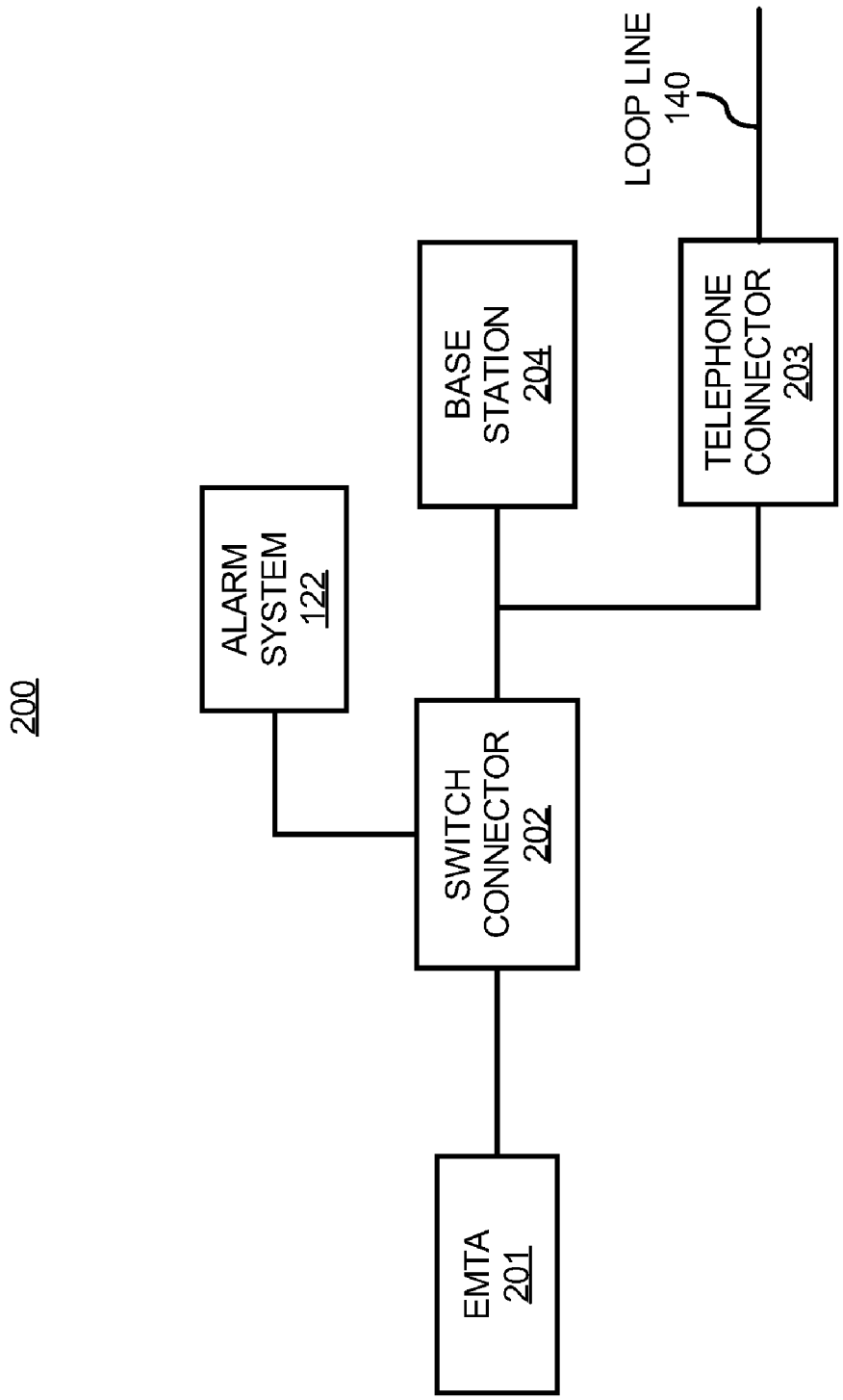
FIG. 2 illustrates a telephony device, according to an embodiment.

FIG. 2 illustrates a block diagram of the telephony device 200, according to an embodiment, that may be used at the customer premises to connect the alarm system 122 to a VoIP service and provide the additional functionality of allowing the alarm system 122 to seize the line. The telephony device 200 includes an EMTA 201, a switch connector 202, and a telephone connector 203. The telephone connector 203 may connect the loop line 140 to the EMTA 201 or the telephone connector 203 may connect directly to CPE, such as a telephone or fax machine. The telephone connector 203, for example, is an RJ-11 connector.

The switch connector 202 connects the alarm system 122 between the EMTA 201 and a telephone circuit, such as the telephone connector 203, the loop line 140, CPE, etc. When the alarm system 122 is connected via the switch connector 202, telephone signals between the EMTA 201 and, for example, the loop line 140 are routed through the alarm system 122 via the switch connector 202. Then, the alarm system 122, as needed, can seize the line and make calls when needed, for example, to the remote monitoring station 107 shown in FIG. 1 or to authorities. Conventional circuitry in the alarm system 122 makes the determination of whether to seize the line and includes functionality to seize the line as needed.

When the alarm system 122 is not connected to the switch connector 202, the switch connector 202 connects the EMTA 201 and the loop line 140. Then, VoIP service is provided at the customer premises as if the EMTA 201 is connected directly to the loop line 140.

In one embodiment, the switch connector 202 comprises an RJ-31X connector. The RJ-31X connector includes a socket. A plug for the alarm system 122 mates with the socket to mechanically and electrically connect the alarm system 122 to the telephony device 200 through the RJ-31X connector. The mechanical connection to the telephony device may be made using other connectors. The plug, for example, is connected to an alarm system panel in the alarm system 122. When the alarm system plug is connected to the RJ-31X connector, tip and ring voltage is passed to the alarm system equipment, where the alarm system equipment decides whether to seize the line or decides whether the dial tone is passed back to the MTA 121 and on to the local loop. When the alarm system plug is removed from the RJ-31X connector, shorting bars in the connector connect the input lines to the output lines. In other words, the shorting bars pass tip and ring voltages between the EMTA 201 and, for example, CPE on the loop line 140. Other types of connectors that operate in the same manner may be used instead of the RJ-31X.

Also shown in FIG. 2 is a cordless telephone base station 204. In one embodiment, the base station 204 is integrated in the telephony device 200 with the EMTA 201, switch connector 202 and the telephone connector 203. The switch connector 202 operates in the same manner with the base station 204. That is, when the alarm system 122 is connected to the switch connector, all telephone signals between the EMTA 201 and the base station 204 pass through the alarm system 122, allowing the alarm system 122 to seize the telephone line when needed. When the alarm system 122 is not connected, the switch connector 202 allows telephone signals to pass directly between the base station 204 and the EMTA 201.

Figure 3:
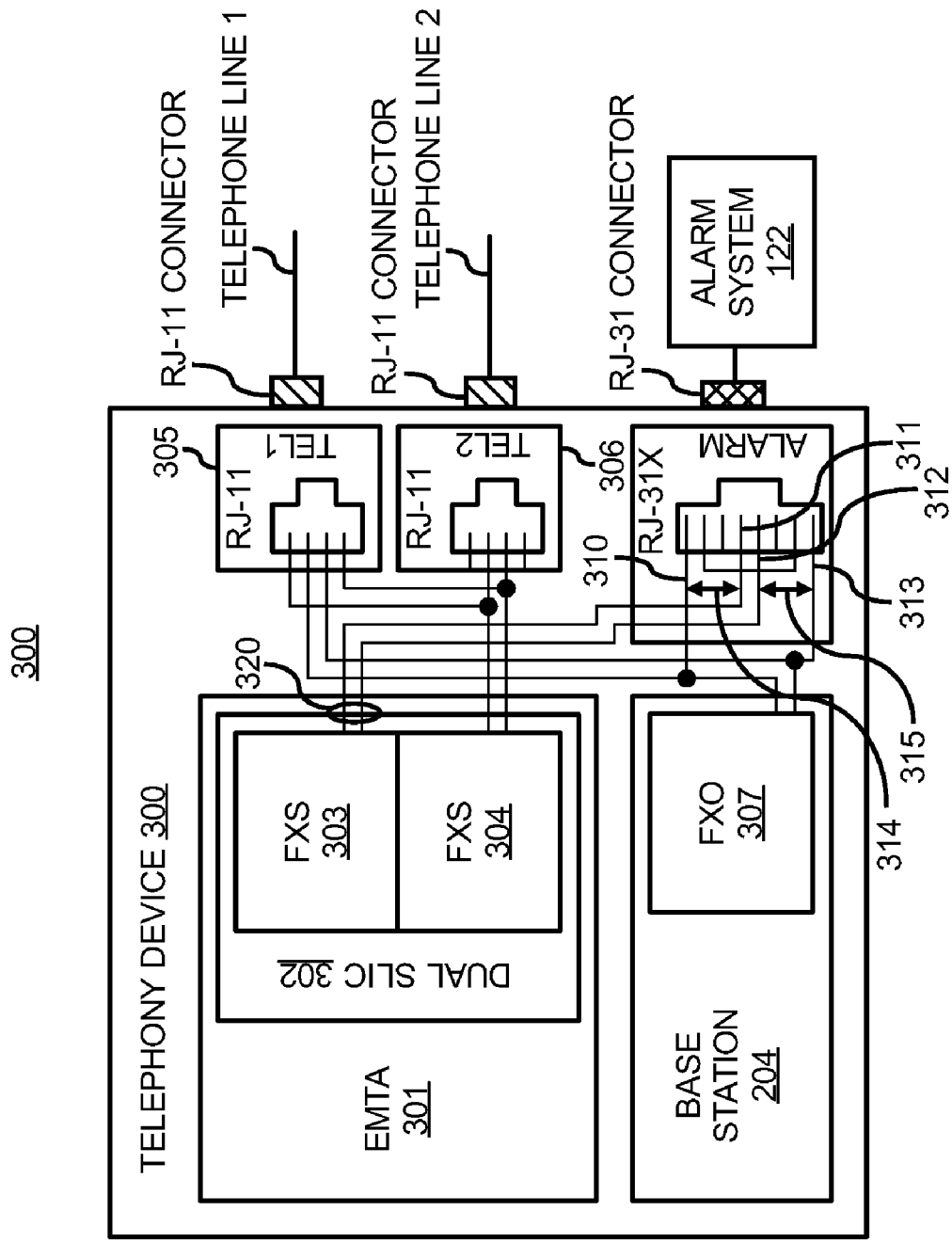
FIG. 3 illustrates wiring for the telephony device, according to an embodiment.

FIG. 3 illustrates a wiring diagram of a telephony device 300. The telephony device 300 is the same as the telephony device 200 shown in FIG. 2 except the telephony device 300 includes two telephone lines instead of one telephone line shown in FIG. 2. The telephony device 300 includes an EMTA 301 with a dual subscriber line integrated circuit (SLIC) 302. As is known in the art, the SLIC emulates a telephone central office and generates tip and ring voltages on the loop line 140 at the customer premises. The dual SLIC 302 provides a SLIC for each telephone line. The dual SLIC 302 includes foreign exchange station (FXS) circuits 303 and 304. FXS 303 and 304 are interfaces to the analog telephone circuits at the customer premises. FXS 303 and 304 may include digital-to-analog or analog-to-digital circuits and a CODEC. The FXS 303 and 304 are connected to telephone connectors 305 and 306 respectively, which may be conventional RJ-11 telephone jacks. Other types of connectors may instead be used.

As shown in FIG. 3, the alarm system 122 is connected between the EMTA and one or more telephone circuits. In the embodiment shown in FIG. 3, the alarm system 122 is connected between the FXS 303 in the EMTA 301 and telephone circuits. The telephone circuits may include the telephone connector 305 or CPE connected to the telephone connector 305, for example, via a loop line or directly connected to the telephone connector 305. The FXS 303 provides telephone line 1 through wires 320. The two wires 320 from the FX 303 are connected to the switch connector 202, and the two wires 320 may carry telephone signals for a twisted pair loop line at the customer premises. The wires 320 are also connected through the switch connector 202 to the telephone connector 305 and a foreign exchange office (FXO) circuit 307, which is a telephone circuit in the base station 204. The FXO 307 is an interface circuit similar to the FXS 303 and 304 and converts analog speech to digital signals and vice versa.

The switch connector 202 is configured to connect the alarm system 122 first-in-line between the EMTA 301 and the telephone circuits. The switch connector 202 includes two input/output (I/O) lines. In this embodiment, each I/O line is comprised of a pair of conductors, such as conductors 310-311 providing a first I/O line and conductors 312-313 providing a second I/O line. When the alarm system 122 is not connected to the switch connector 202, switches 314 and 315 in the switch connector 202 are closed and conductors 310 and 311 as well as 312 and 313 are connected with each other. Thus, telephone signals output from FXS 303, such as analog speech signals, are passed via switch connector 202 to telephone connector 305 and FXO 307. Also, telephone signals output from CPE connected to the loop line, shown as telephone line 1, via telephone connector 305 and the FXO 307 are passed via the switch connector 202 to the FXS 303. Note that telephone line 1 includes the line connected to FXS 202 and telephone line 2 includes the line connected to FXS 304. Each line may have a different telephone number assigned to it.

When the alarm system 122 is connected to the switch connector 202, switches 314 and 315 in the switch connector 202 are opened and disconnect lines 310 and 311 and disconnect lines 312 and 313, respectively. Thus, telephone signals output from FXS 303 are passed to the alarm system 122 first before being transmitted to the telephone connector 305 and the FXO 307. Also, telephone signals output from the telephone line 1 and the FXO 307 are passed via the alarm system 122 to the FXS 303. The alarm system 122 may include a panel connecting the lines 310-313 to circuitry that is operable to seize telephone line 1 when needed. For example, if the alarm system 122 determines that a call needs to be made to remote monitoring system 107 shown in FIG. 1, then alarm system 122 seizes telephone line 1. In one example of seizing the line, the alarm system 122 uses a relay that breaks the connection between the telephone connector 203 and/or base station 204 to the EMTA 201 and then makes the connection between the alarm system 122 and the EMTA 201. When the alarm system 122 detects a problem, it activates the relay to break the normal telephone connection to the EMTA 201, which then makes a connection to the alarm system 122 to complete the call to the remote monitoring station 107. Any call that is active on telephone line 1 will be disconnected when the line is seized so the alarm system 122 can call the remote monitoring system 107.

Telephone line 2 is not affected by the operation of the alarm system 122. Thus, calls can continue to be made or received for telephone line 2. Note that the interior conductors (e.g., pins) for telephone connector 306 for telephone line 2 are connected to the telephone connector 305. This is meant to show that if needed, a telephone connector can connect to two lines if it has more than two pins. For example, the inner pins for telephone connector 305 are used for telephone line 1 and the outer pins can be used for a second line, such as telephone line 2. It will be apparent to one of ordinary skill in the art that telephone line 2 does not need to be connected to telephone connector 305.

Although FIG. 3 shows cordless base station 204 and telephone connector 306 for a second telephone line, in other embodiments the telephony device 300 may not include one or more of the base station 204 and the second telephone connector 306. Also, in other embodiments, the telephony device 300 may include telephone connectors for more than two telephone lines. Also, CPE, such as telephones, fax machines, etc., may be connected to one or more of telephone line 1 and telephone line 2. Also, the cordless base station 204 is part of a cordless telephone system that may include one or more cordless handsets.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A switch connector for a voice-over-Internet-protocol (VoIP) service, the switch connector comprising:
   a first switch connecting or disconnecting a first set of conductors in the connector; and
   a second switch connecting or disconnecting a second set of conductors in the connector,
   wherein the first and second set of conductors in the connector are connected between a multimedia terminal adaptor (MTA) providing VoIP service and a telephone circuit, and
   when a system is mechanically connected to the switch connector, the first switch and the second switch are opened resulting in telephone signals transmitted between the MTA and the telephone circuit being passed via the system, and
   when the system is not mechanically connected to the switch connector, the first switch and the second switch are closed resulting in telephone signals transmitted between the MTA and the telephone circuit via the closed switches.

2. The switch connector of claim 1, wherein the switch connector includes a socket that is configured to mate with a plug of the system to provide the mechanical connection to the switch connector.

3. The switch connector of claim 2, wherein when the system is mechanically connected to the switch connector, the first and second set of conductors are electrically connected with the system to pass the telephone signals to the system.

4. The switch connector of claim 1, wherein the system is an alarm system configured to seize a telephone line through the switch connector and disconnect an active call when seizing the telephone line.

5. The switch connector of claim 1, wherein the first and second set of conductors are electrically connected with a cordless telephone base station, and
   when the system is mechanically connected to the switch connector, the first switch and the second switch are opened resulting in telephone signals transmitted between the MTA and the cordless telephone base station being passed via the system, and
   when the system is not mechanically connected to the switch connector, the first switch and the second switch are closed resulting in telephone signals transmitted between the MTA and the cordless telephone base station via the closed switches.

6. The switch connector of claim 1, wherein the first set of conductors and the second set of conductors are connected to a twisted pair telephone line via the telephone circuit.

7. The switch connector of claim 1, wherein the first switch and the second switch are mechanical switches that automatically open when the system is mechanically connected to the switch connector.

8. A telephony device configured to provide VoIP service at a customer premises, the telephony device comprising:
   an embedded MTA (EMTA);
   at least one telephone circuit; and
   a switch connector, wherein the switch connector includes
      a first switch connecting or disconnecting a first set of conductors in the connector; and
      a second switch connecting or disconnecting a second set of conductors in the connector,
      wherein the first and second set of conductors in the connector are connected between the EMTA and the at least one telephone circuit, and
      when a system is connected to the switch connector, the first switch and the second switch are opened resulting in telephone signals transmitted between the EMTA and the at least one telephone circuit being passed via the system, and
      when the system is not connected to the switch connector, the first switch and the second switch are closed resulting in telephone signals transmitted between the EMTA and the at least one telephone circuit via the closed switches.

9. The telephony device of claim 8, wherein the at least one telephone circuit comprises a circuit in a cordless telephone base station.

10. The telephony device of claim 9, wherein the cordless telephone base station is integrated into the telephony device as a single device with the EMTA and the cordless telephone base station.

11. The telephony device of claim 8, wherein the at least one telephone circuit comprises a telephone connector connecting the EMTA to a twisted pair loop line at the customer premises or customer premises equipment.

12. The telephony device of claim 8, wherein the switch connector includes a socket that is configured to mate with a plug of the system to provide the mechanical connection to the switch connector.

13. The telephony device of claim 12, wherein when the system is connected to the switch connector, the first and second set of conductors are electrically connected with the system to pass the telephone signals to the system.

14. The telephony device of claim 8, wherein the system is an alarm system configured to seize a telephone line connected to the at least one telephone circuit through the switch connector and disconnect an active call when seizing the telephone line.

15. The telephony device of claim 8, wherein the first set of conductors and the second set of conductors are connected to a twisted pair telephone line via the at least one telephone circuit.

16. The telephony device of claim 8, wherein the first switch and the second switch are mechanical switches that automatically open when the system is connected to the switch connector.

17. A telephony device configured to provide VoIP service at a customer premises, the telephony device comprising:
   an embedded MTA (EMTA);
   at least one telephone circuit; and
   a switch connector configured to connect an alarm system to the at least one telephone circuit and the EMTA, wherein the switch connector includes:
      a first switch configured to connect or disconnect a first input/output (I/O) line of the switch connector to the alarm system; and
      a second switch configured to connect or disconnect a second input/output (I/O) line of the switch connector to the alarm system, and
      when the alarm system is connected to the switch connector, the first switch and the second switch are opened resulting in telephone signals transmitted between the EMTA and the at least one telephone circuit being passed via the alarm system using the first and second I/O lines in the switch connector, and
      when the alarm system is not connected to the switch connector, the first switch and the second switch are closed resulting in telephone signals transmitted between the EMTA and the at least one telephone circuit via the closed switches.

18. The telephony device of claim 17, wherein the first and second I/O lines in the switch connector are connected to a twisted pair telephone line at the customer premises via the at least one telephone circuit.

19. The telephony device of claim 17, wherein the first I/O line includes a first set of conductors and the second I/O line includes a second set of conductors.

20. The telephony device of claim 19, wherein the first switch connects or disconnects the first set of conductors, and the second switch connects or disconnects the second set of conductors.

* * * * *